Hopson & Brooks,

Belt Buckle.

No. 1,681. Reissued May 31, 1864.

Witnesses;

J. W. Coombs

G. W. Reed

Inventor;

O. L. Hopson

J. P. Brooks per Munn & Co attorneys,

N. PETERS, PHOTO-LITHOGRAPHER, WASHINGTON, D. C

UNITED STATES PATENT OFFICE.

O. L. HOPSON AND H. P. BROOKS, OF WATERBURY, CONNECTICUT.

IMPROVEMENT IN BUCKLES.

Specification forming part of Letters Patent No. 38,482, dated May 12, 1863; Reissue No. 1,681, dated May 31, 1864.

*To all whom it may concern:*

Be it known that we, O. L. HOPSON and H. P. BROOKS, of Waterbury, in the county of New Haven and State of Connecticut, have invented a new and Improved Buckle; and we do hereby declare that the following is a full, clear, and exact description of the same, reference being had to the accompanying drawings, making a part of this specification, in which—

Figure 2:
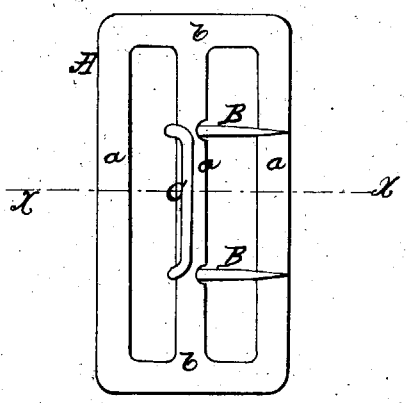
Figure 3:
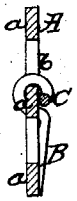
Figure 1:
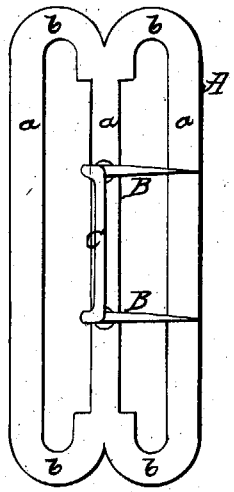

Figures 1 and 2 are front or face views of our invention; Fig. 3, a transverse section of the same, taken in the line *x x*, Fig. 2.

Similar letters of reference indicate corresponding parts in the several figures.

This invention relates to an improvement in the construction of that class of buckles which are designed to be used on garments and articles pertaining thereto.

The object of the invention is to obtain a buckle of the kind specified which will be strong and durable, capable of being economically constructed out of a limited quantity of stock, and be comparatively small, or not monopolize as much space as those hitherto constructed.

To enable those skilled in the art to fully understand and construct our invention, we will proceed to describe it.

A represents the frame of the buckle, which in this case is represented as composed of three longitudinal bars, *a a′ a″*, connected at their ends by cross-bars *b*, which may be of either straight or curved form. Two bars, *a a′*, may only be employed, and for certain purposes would be preferable to the three bars.

B B represent the prongs or tongues of the buckle, which are formed out of a single piece of wire, bent so as to have the prongs or tongues parallel with each other and at a suitable distance apart. The portion C of the wire, when the prongs or tongues are in contact with the frame A, bears on the front side of the bar *a′*, on which the prongs or tongues are fitted. This wire may pass through holes $a^{\times}$ in the bar *a′*, on which it is fitted; or it may be bent around said bar. In Fig. 1 the wire is shown passing through $a^{\times}$, and in Fig. 2 as being bent around it, with the prongs fitting in notches $b^{\times}$. The object of these holes or notches is to prevent the prongs or tongues from slipping on the bar *a′*; but other means may be employed to effect such result. For instance, the bar *a′* may be bent at each side of the portion C of the wire which forms the prongs; or said bar may be flattened or swaged so as to be expanded at each side of C to form stops to prevent the slipping of the prongs. We do not confine ourselves to any particular means for effecting this result.

The frame A, whether composed of two or more bars, may be struck or cut out of a single piece of metal plate; or it may be formed of a piece of wire bent in the form described.

By this mode of construction a strong and durable buckle is obtained with a limited amount of stock, and it may be made quite narrow. The ordinary buckles for garments, being made of thin metal, are very liable to be broken or drawn apart, especially if the prongs or tongues are attached to the frame by joints or pivots. Buckles of this class require to be made of thin metal, and the great difficulty to be overcome in their construction is to obtain the requisite strength with lightness. By our mode of construction it is believed that the desired end is fully attained.

By having the prongs or tongues B constructed of one piece of wire and secured to the buckle as described much labor and stock are saved, as the wire may be purchased of the requisite size, cut into required lengths, and then bent in proper form and applied to the buckle at a small expense.

Having thus described our invention, what we claim as new, and desire to secure by Letters Patent, is—

A buckle the prongs of which are made of one piece of wire bent and applied to a bar of the frame, substantially as described, and prevented from sliding on the bar by means of holes, notches, or other suitable stops formed in or on the bar, as herein set forth.

O. L. HOPSON.
H. P. BROOKS.

Witnesses:
ELIPHALET BUEL,
THEODORE S. BUEL.